July 29, 1958     H. TER STEEGE     2,845,016
VENTILATING DEVICE ESPECIALLY FOR A MOTOR DRIVEN VEHICLE
Filed March 12, 1956     4 Sheets-Sheet 1

INVENTOR
Hendrik Ter Steege

BY Wenderoth, Lind & Ponack
ATTORNEYS

July 29, 1958 H. TER STEEGE 2,845,016
VENTILATING DEVICE ESPECIALLY FOR A MOTOR DRIVEN VEHICLE
Filed March 12, 1956 4 Sheets-Sheet 2
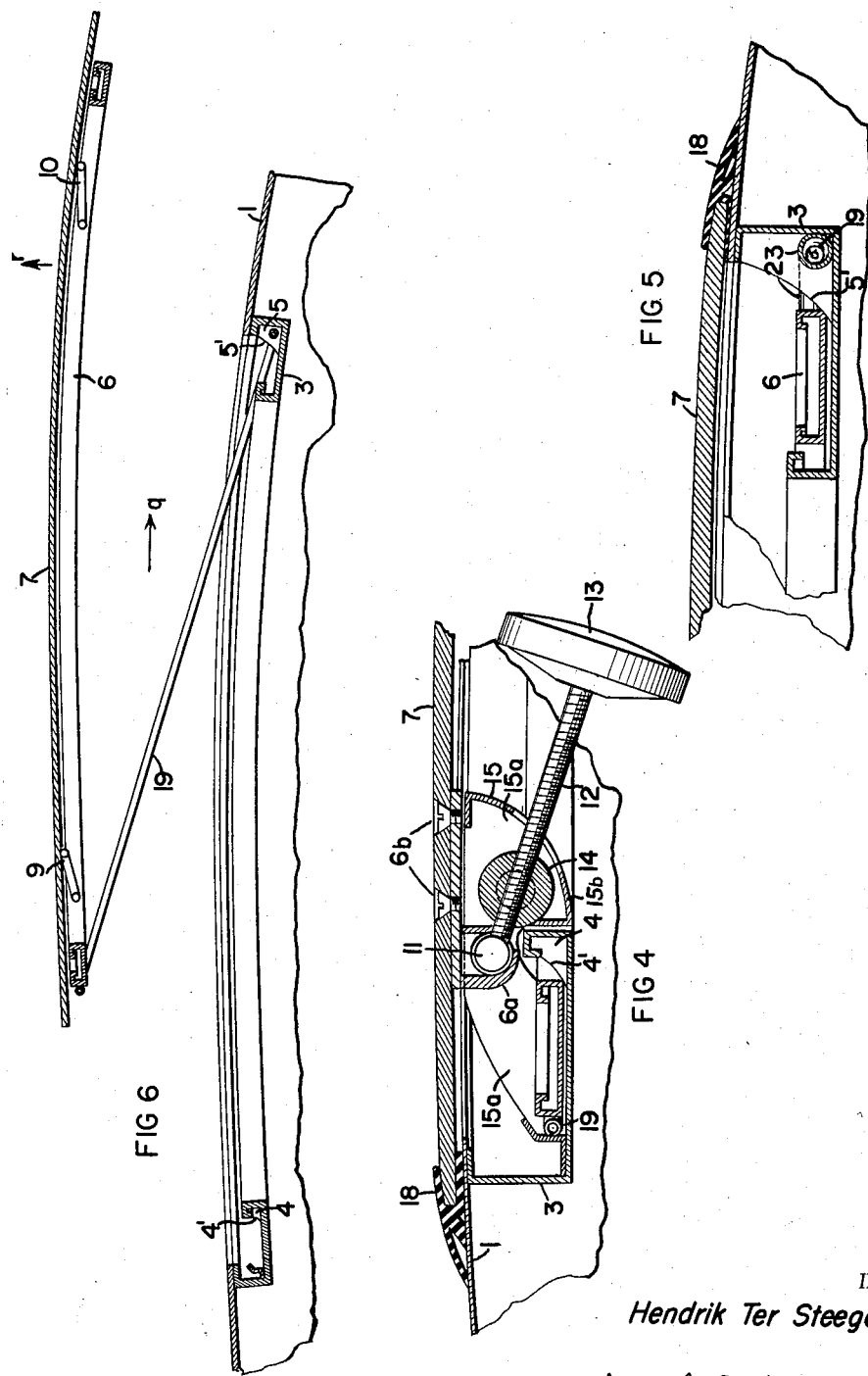
INVENTOR
Hendrik Ter Steege
BY Wenderoth, Lind and Ponack
ATTORNEYS July 29, 1958 H. TER STEEGE 2,845,016
VENTILATING DEVICE ESPECIALLY FOR A MOTOR DRIVEN VEHICLE
Filed March 12, 1956 4 Sheets-Sheet 3

INVENTOR.
HENDRIK TER STEEGE
BY
ATTYS.

July 29, 1958  H. TER STEEGE  2,845,016
VENTILATING DEVICE ESPECIALLY FOR A MOTOR DRIVEN VEHICLE
Filed March 12, 1956  4 Sheets-Sheet 4

INVENTOR.
HENDRIK TER STEEGE
BY
Attys.

United States Patent Office 2,845,016
Patented July 29, 1958

2,845,016

VENTILATING DEVICE ESPECIALLY FOR A MOTOR DRIVEN VEHICLE

Hendrik Ter Steege, Amsterdam, Netherlands

Application March 12, 1956, Serial No. 570,818

Claims priority, application Netherlands March 16, 1955

8 Claims. (Cl. 98—2)

The invention relates to a ventilating device, especially for a car body of a motor driven vehicle, for ventilating rooms in vessels, railway cars and the like.

The object of the invention is the provision of a construction offering a highly improved ventilation possibility of car bodies, vessels, railway cars and the like.

The ventilating device according to the invention comprises a panel adapted to be arranged in an aperture of the roof of an object to be ventilated, a mechanism for actuating said panel and raising at least part thereof above said roof, and means for releasing said panel such as to free said aperture therefrom and allow the use of said aperture as an emergency exit.

The panel may be adapted to be raised in a position in which it is at an angle with the roof surface. The panel may also be adapted to slide along the roof surface such as to open only part of the aperture.

The invention, consequently, is not concerned with a panel which is adapted to slide such as to entirely open the aperture, as is the case with known constructions for car bodies, which may cause a disturbing draught in the car body, especially for people sitting in the back of the vehicle.

Although normally no large open aperture can be obtained in the car body with the aid of the construction according to the invention, yet the impression can completely be given that one is driving in an open car, this as a result of the excellent ventilation by means of slots, formed between the panel and the roof and acting as a kind of Venturi nozzle, whilst the panel may consist of transparent material, e. g. a transparent plastic.

The device according to the invention enables mounting the windows in the car body and the doors therein in a permanently closed position, so that actuating mechanisms for window panes, which may display all kinds of defects in due time, can be omitted.

Figure 1:
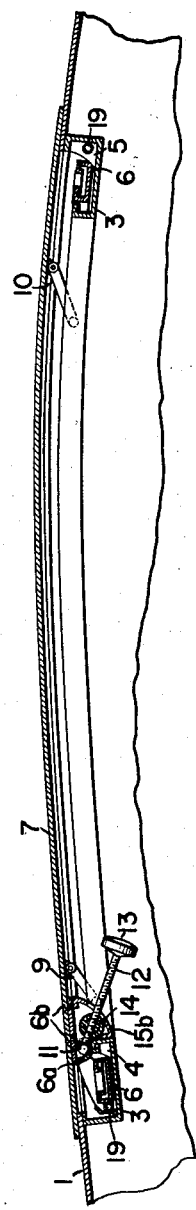
Figure 2:
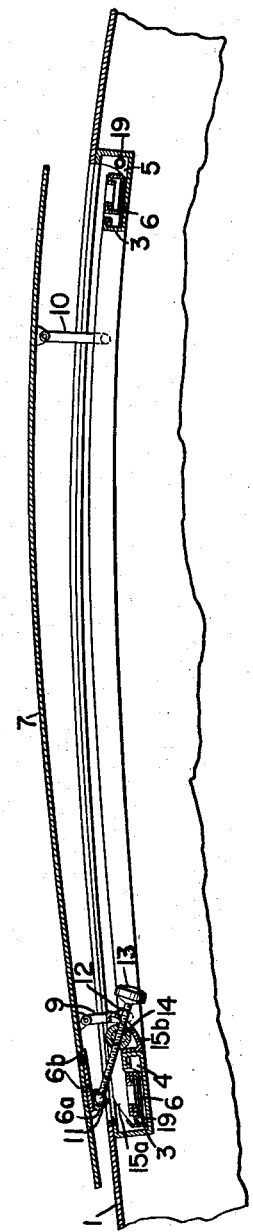
Figure 3:
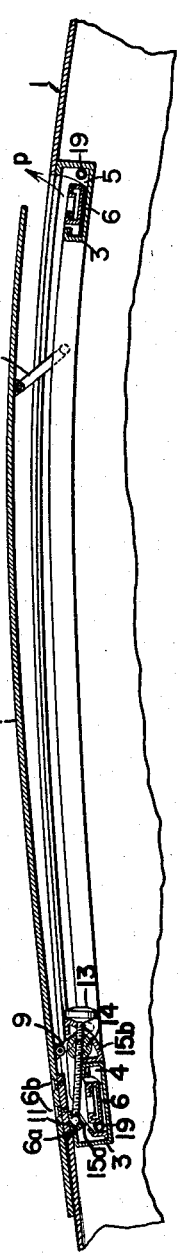
Figure 7:
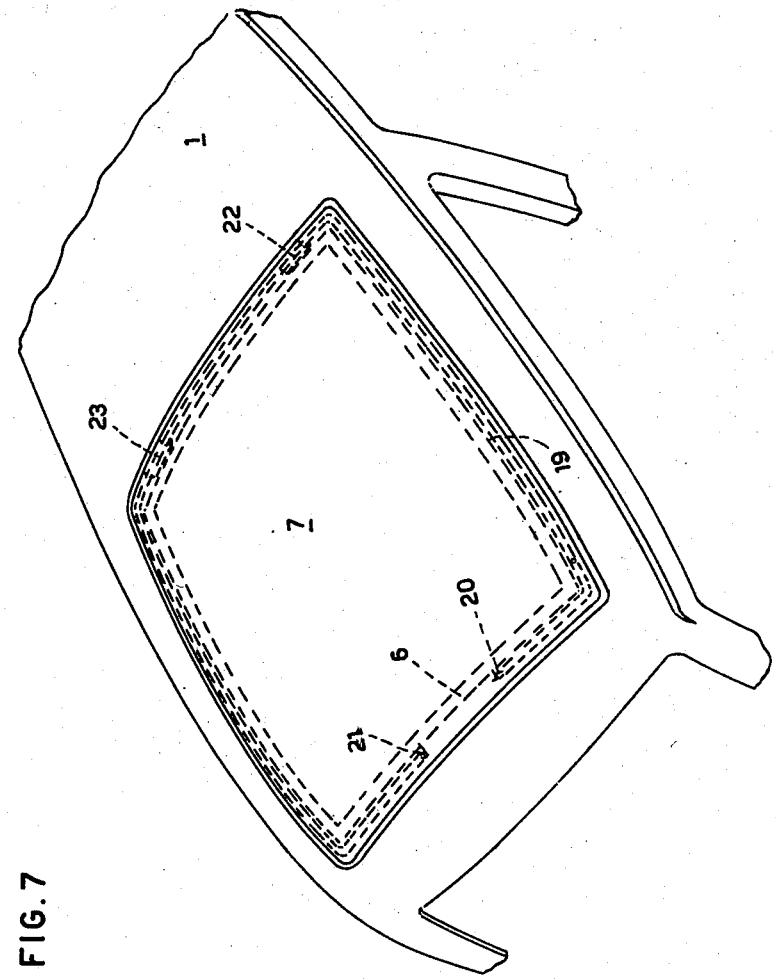
Figure 8:
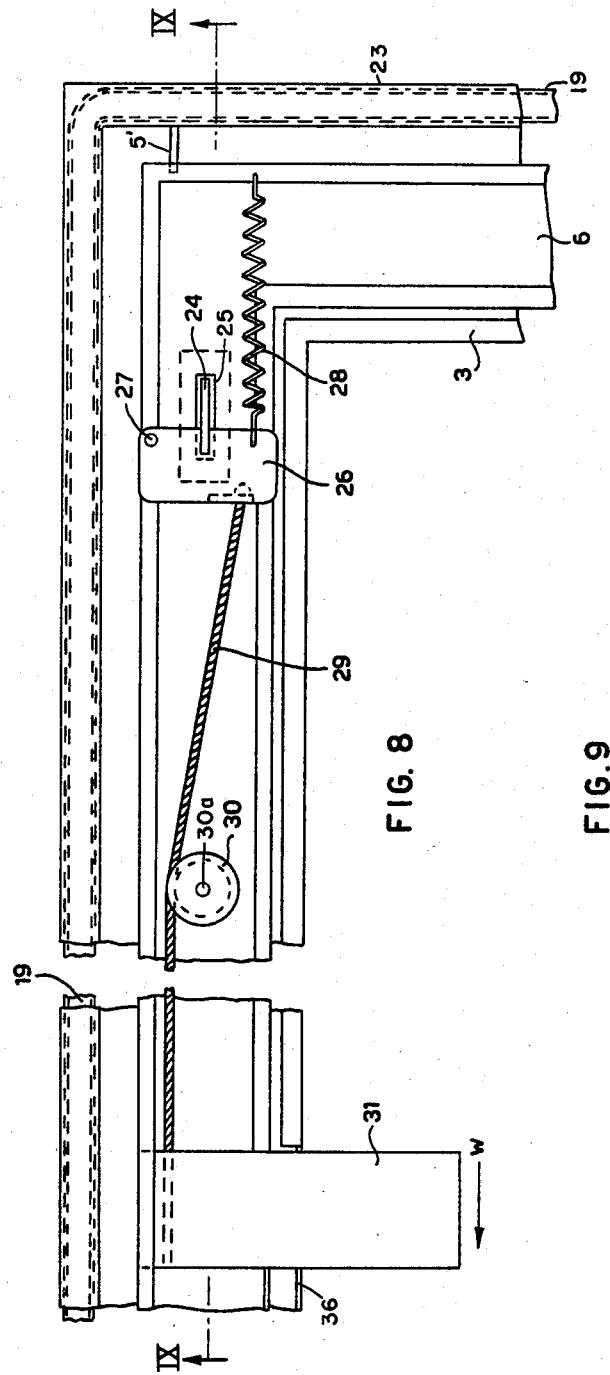
Figure 9:
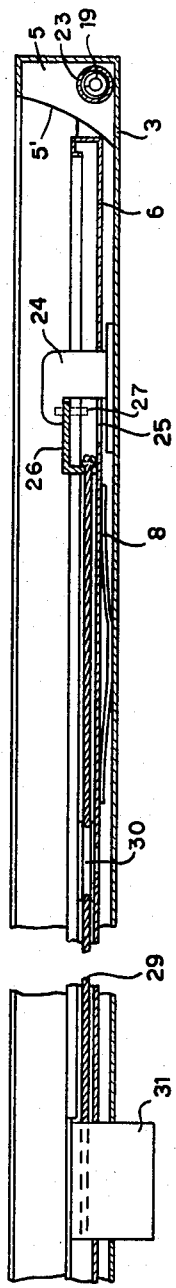

The drawing shows an embodiment and namely in Figures 1–3 a diagrammatic longitudinal section of the ventilating device in various positions;

Figure 4, a view on a larger scale of the actuating device for the panel at its front side;

Figure 5, a section on a larger scale of the trailing end of the panel;

Figure 6, a view of the panel when it provides for an emergency exit;

Figure 7, a diagrammatic plan view on the roof of a car body;

Figure 8, a partial plan view of the locking device for the panel;

Figure 9, a section along the line IX—IX in Figure 8.

In the roof 1 of a car body an aperture 2 is made, along the edge of which a frame 3 of channel material is secured, for example by welding to the roof 1. In this channel frame there are welded, brazed or otherwise secured guide members 4 and 5 of sheet metal or the like having guide faces 4' and 5' thereon, along which guide faces an inner frame 6 which is connected with a panel 7 can slide under the influence of blade springs 8 (Figure 9). In normal position the inner frame is locked in the outer frame 3 with the aid of a locking device which is to be described later on. By means of links 9 and 10 pivoted to panel 7 and inner frame 6 the panel is connected with the inner frame 6. Adjacent the inner frame 6 (Figure 4) a seat 6a is mounted on panel 7 by screws 6b to receive a ball at the end of a screw spindle 12 with an actuating knob 13. This screw spindle is movable through a nut 14 which is pivotally mounted in a support 15 consisting of two side members 15a which appear as the curved lines in Fig. 4, and the substantially closed channel member 15b attached to the side members 15a. The support 15 is secured by welding, brazing or the like to frame 6. By rotation of the knob 13 the panel, guided by the links 9 and 10, can be brought into the positions according to Figures 2 and 3.

In the position according to Figure 2 slots 16 and 17 of different sizes are obtained at the front and rear sides of the panel.

In the position according to Figure 3 a ventilating slot 17a is obtained only at the trailing end of the panel.

Thus the panel 7 can be brought into different positions for controlling the ventilation of the interior of the car body. Sealing members 18 of elastic material, such as rubber (see Figures 4 and 5) have been arranged along the edges of the panel 7 so that the panel 7 can sit duly sealed on the roof of the car body.

Around the inner frame (panel frame) a resilient member, e. g. an elastic cable 19 (Figure 7) is arranged. The cable is hooked by hooks 20 and 21 to an inner frame 6 and at the rear of the frame is passed through tubular guides 22, 23, attached to frame 3, and when the inner frame 6 is brought into the outer frame 3 along the guide faces 4' and 5' this cable is tensioned. The cable, consequently, has the tendency to draw the inner frame backwards along the guide faces 4' and 5' (see arrow Q, Figure 6). Additionally the springs 8 have the tendency to press the inner frame 6 with the panel 7 outwards (see arrow r, Figure 6).

Figure 6 shows what happens with the panel 7 and the inner frame 6 when the locking device between the inner and outer frame is released. The panel then is first pushed outwards and thereupon, so to say, fired backwards by the cable 19 in the way of catapult.

The construction of the locking device appears from Figures 8 and 9. On the bottom of the outer frame 3 hooks 24 are arranged extending through openings 25 in the inner frame 6 below which pawls 26 rotatable about the point 27 may grip. The pawl 26 is under the influence of a tension spring 28 and can be drawn from below the hook 24 by a cable 29 which is guided over a roller 30 mounted on pin 30a the wire then being attached to a handle 31 by welding, soldering or the like. Handle 31 is slidably mounted in slot 36 in frame 3. When this handle in Figure 8 is moved forwards according to the arrow w the pawls 26 are removed from the hooks 24. The springs 8 and the elastic cable 19 come into action. The panel is flung outwards to provide for an emergency exit according to Figure 6.

What I claim is:

1. A ventilating device for moving vehicles, vessels and the like having an aperture therein comprising a frame secured around the edge of said aperture, an inner frame in said frame, a panel fitted over the aperture, means for attaching said panel to said inner frame for moving said panel relative to said inner frame to space said panel from said inner frame to leave a smaller space between one side edge of said panel toward one end of the vehicle and said inner frame than between the side edge of said panel toward the other end of the vehicle and said inner frame, and quick releasing means releasably securing said inner frame to said frame.

2. A ventilating device for moving vehicles, vessels and the like having a rear facing in a direction opposite to the direction in which the vehicle is moving and having a roof with an aperture therein, comprising a channel frame secured to the roof around the edge of the aperture by the outer edge of said channel frame, an inner frame in said channel frame, a panel fitted over the aperture, means for attaching said panel to said inner frame comprising two pairs of links pivoted between the sides of the inner frame and the sides of said panel, the links toward the rear of the vehicle, vessel and the like being longer than the other links, means for moving said panel relative to said inner frame to space said panel from the roof, and quick release means releasably securing said inner frame to said channel frame.

3. A ventilating device for moving vehicles, vessels and the like having a rear facing in a direction opposite to the direction in which the vehicle is moving and having a roof with an aperture therein, comprising a channel frame secured to the roof around the edge of the aperture by the outer edge of said channel frame, an inner frame in said channel frame, a panel fitted over the aperture, means for attaching said panel to said inner frame comprising two pairs of links pivoted between the sides of the inner frame and the sides of said panel, the links toward the rear of the vehicle, vessel and the like being longer than the other links, means for moving said panel relative to said inner frame comprising a socket on said panel, a ball rotatably mounted in said socket, a threaded screw on said ball, and a nut through which said screw is threaded pivotally mounted on said inner frame, and quick release means releasably securing said inner frame to said channel frame.

4. A ventilating device for moving vehicles, vessels and the like having a rear facing in a direction opposite to the direction in which the vehicle is moving and having a roof with an aperture therein, comprising a channel frame secured to the roof around the edge of the aperture by the outer edge of said channel frame, an inner frame in said channel frame, a panel fitted over the aperture, means for attaching said panel to said inner frame comprising two pairs of links pivoted between the sides of the inner frame and the sides of said panel, the links toward the rear of the vehicle, vessel and the like being longer than the other links, means for moving said panel relative to said inner frame comprising a socket on said panel, a ball rotatably mounted in said socket, a threaded screw on said ball, and a nut through which said screw is threaded pivotally mounted on said inner frame, and quick release means comprising guide faces in the channels of said channel frames extending transversely of the direction in which said panel moves relative to said inner frame, said guide faces for guiding said inner frame out of said channel frame, resilient means between said inner frame and said channel frame urging said inner frame against said guide faces, and locking means releasably locking said inner frame and said outer frame.

5. A ventilating device as claimed in claim 4 in which said resilient means comprise an elongated elastic member secured to the end of said channel frame toward which said inner frame is urged by said resilient means, said elongated elastic member being passed around and secured to the end of said inner frame opposite the end of said channel frame to which the elongated elastic member is secured, said elongated elastic member being under tension when said inner frame is positioned in said channel frame.

6. A ventilating device for moving vehicles, vessels and the like having a rear facing in a direction opposite to the direction in which the vehicle is moving and having a roof with an aperture therein, comprising a channel frame secured to the roof around the edge of the aperture by the outer edge of said channel frame, an inner frame in said channel frame, a panel fitted over the aperture, means for attaching said panel to said inner frame comprising two pairs of links pivoted between the sides of the inner frame and the sides of said panel, the links toward the rear of the vehicle, vessel and the like being longer than the other links, and means for moving said panel relative to said inner frame to space said panel from the roof.

7. A ventilating device for moving vehicles, vessels and the like having a rear facing in a direction opposite to the direction in which the vehicle is moving and having a roof with an aperture therein, comprising a channel frame secured to the roof around the edge of the aperture by the outer edge of said channel frame, an inner frame in said channel frame, a panel fitted over the aperture, means for attaching said panel to said inner frame comprising two pairs of links pivoted between the sides of the inner frame and the sides of said panel, the links toward the rear of the vehicle, vessel and the like being longer than the other links, and means for moving said panel relative to said inner frame comprising a socket on said panel, a ball rotatably mounted in said socket, a threaded screw on said ball, and a nut through which said screw is threaded pivotally mounted on said inner frame.

8. A ventilating device for moving vehicles, vessels and the like having a rear facing in a direction opposite to the direction in which the vehicle is moving and having a roof with an aperture therein, comprising a channel frame secured to the roof around the edge of the aperture by the outer edge of said channel frame, an inner frame in said channel frame, a panel fitted over the aperture, means for attaching said panel to said inner frame comprising two pairs of links pivoted between the sides of the inner frame and the sides of said panel, the links toward the rear of the vehicle, vessel and the like being longer than the other links, and means for moving said panel relative to said inner frame comprising a socket on said panel, a ball rotatably mounted in said socket, a threaded screw on said ball, and a nut through which said screw is threaded pivotally mounted on said inner frame.

References Cited in the file of this patent

UNITED STATES PATENTS

| 1,348,593 | Spiegel | Aug. 3, 1920 |
| 2,132,228 | Bishop | Oct. 4, 1938 |
| 2,173,890 | Tuttle | Sept. 26, 1939 |